United States Patent [19]
Holmes

[11] 3,996,084
[45] Dec. 7, 1976

[54] LOCK CORE PANEL

[75] Inventor: Richard N. Holmes, Laguna Beach, Calif.

[73] Assignee: McDonnell Douglas Corporation, Long Beach, Calif.

[22] Filed: May 21, 1975

[21] Appl. No.: 579,378

Related U.S. Application Data

[62] Division of Ser. No. 479,842, June 17, 1974, Pat. No. 3,960,236.

[52] U.S. Cl. .............................. 156/93; 156/155; 156/197; 181/33 GA; 428/102; 428/43; 428/113; 428/116
[51] Int. Cl.² ................................ B32B 7/08
[58] Field of Search ................ 156/93, 197, 155; 428/102, 113, 116, 43; 181/33 GA, 33 G, 42

[56] References Cited

UNITED STATES PATENTS

| | | | |
|---|---|---|---|
| 1,804,529 | 5/1931 | Dreyfus | 156/2 |
| 2,081,765 | 5/1937 | Prudden | 428/101 |
| 3,502,171 | 3/1970 | Cowan | 181/42 |
| 3,544,417 | 12/1970 | Corzine | 156/93 |
| 3,769,142 | 10/1973 | Holms et al. | 428/113 |
| 3,831,710 | 8/1974 | Wirt | 428/116 |
| 3,874,958 | 4/1975 | Scholtis et al. | 156/155 |

*Primary Examiner*—Edward G. Whitby
*Attorney, Agent, or Firm*—Walter J. Jason; Donald L. Royer; John P. Scholl

[57] ABSTRACT

A lock core panel wherein a face sheet, base sheet and core are integrally joined at each web line by fiber material prior to curing. The upper face sheet comprises layers which may be angularly oriented and selected fibers or strands removed, if desired, to provide desired porosity for noise suppression purposes.

5 Claims, 4 Drawing Figures

LOCK CORE PANEL

This is a division of application Ser. No. 479,842, filed June 17, 1974, now U.S. Pat. No. 3,960,236.

BACKGROUND OF THE PRESENT INVENTION

Lightweight panels may be made by bonding face sheets to an inner core. The face sheets may be of a woven fabric and the core may be of honeycomb, corrugated material or a plurality of ribs. The composite may be dipped or sprayed with a plastic material to give it strength and rigidity. The fabric may be passed through a resin solution in a technique known as preimpregnation wherein the amount of resin remaining on the fibers is controlled. Thereafter, mandrels are fitted into the panel cells and the panel is cured, and made rigid, under appropriate heat and pressure in a suitably formed mold. After removal of the mandrels, additional sound attenuating materials may be placed in the cavities, if desired.

In the foregoing bonded panels the problem always exists that delamination may occur due to resin or adhesive bond failures. One method of overcoming this problem is to weave the top, bottom and core as an integral unit such as shown in U.S. Pat. No. 2,607,104 for Corrugated Fabric and Method of Making the Same, issuing to B. H. Foster on Aug. 19, 1952 and assigned to U.S. Rubber Company. In this case the upper and lower plies are so woven with shrinkable fabric that, after heat is applied, these plies shrink, leaving the center ply as a corrugation. Insulation then fills the area between the outer plies. While this teaching serves the purpose intended, the weave of the outer ply cannot be oriented for optimum strength and acoustic purposes. This same objection applies to the three-dimensional weaving disclosed in U.S. Pat. No. 3,481,427 for Acoustic Panel Structure issuing to Dobbs and Holmes on Dec. 2, 1969 and assigned to the present assignee. U.S. Pat. No. 3,769,142 for Non-Woven Locked Ply Composite Structure issued Oct. 30, 1973 to Holmes and Dobbs and is assigned to the present assignee. In this patent multiple layers of non-prebuckled fibrous material are angularly oriented and interlocked with vertical fiber locks to prevent interlaminar shear. The angular orientation of the plies provide strength in desired directions and also effect the face sheet openings for the acoustical purpose of sound suppression. While this structure is excellent for its intended purpose, further development is needed in apparatus for fabricating such structure.

SUMMARY OF THE PRESENT INVENTION

In accordance with the principles of the present invention a lock core panel is provided wherein a plurality of woven layers comprising a face sheet, and a base sheet are interconnected with a core sheet alternately joined to the face sheet and base sheet. The face sheet layers may be angularly oriented for strength and acoustic requirements, and, if desired, preselected filaments in the woven fabric may be removed, physically or chemically, to obtain a desired porosity. The face, base and core sheets are preimpregnated with a resin but remain dry and flexible during the joining and fabrication steps. Thereafter the composite is formed and cured in a conventional manner, well known in the art, into a rigid structure.

DETAILED DESCRIPTION OF ILLUSTRATIVE EMBODIMENT

Figure 1:
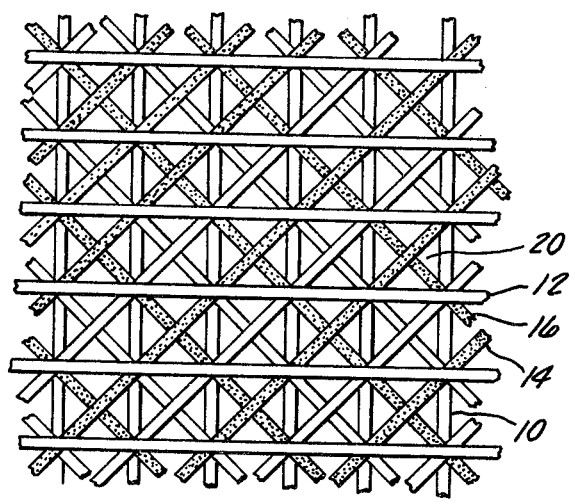
FIG. 1 is a plan view of a face sheet layer wherein certain of the fabric threads are removable.

Referring now to FIG. 1 there is shown a layer of fabric consisting of warp strands 10, weft strands 12, and warp and weft strands 14, 16 angularly oriented, for example, on the order of 45°. The warp and weft strands may be interwoven in the manner of ordinary cloth or the strands may be non-prebuckled and lay in stacked relationship with each other. The same applies to those strands angularly oriented. Also, all four types of strands may be interwoven, if desired. In the illustration shown the warp strands 10 form a lower surface, then angular weft strands 16, then angular warp strands 14, with weft strands 12 on top. For convenience, all strands are referred to as being in one layer which will be identified as a cover sheet 18 in FIGS. 3 and 4.

All strands may be of suitable material such as fiberglass, carbon, boron or graphite fibers, rayon fibers or metal such as tungsten wire, to name but a few popular choices. In one application fiberglass or inorganic fiber strands such as Kelvar 49, a trademark of DuPont, was used.

As an aid in the final formation of a rigid panel the fiber strands may be resin pre-impregnated before weaving or laying up of the strands. One example of resin preimpregnation is set forth in U.S. Pat. No. 3,481,427 issuing Dec. 2, 1969 for Acoustical Panel Structure.

Some of the strands are of a material that may be removed such as by mechanical or chemical means either after the layer has been formed or after the completed panel has been formed, but preferably before the subsequent resin encapsulation step has occurred. In one application rayon acetate strands were used. These dissolve in an appropriate solvent. In another application poly vinyl alcohol strands were used which were dissolved in water. The purpose of using removable strands is to provide for a controlled porosity of cover sheet 18 in FIGS. 3 and 4 for acoustical purposes when the panel is used for noise suppression purposes. In the illustration in FIG. 1 alternate angular warp and weft strands 14, 16 are of the removable type to provide enlarged openings 20. In some applications no angular warp and weft strands are needed.

Figure 2:
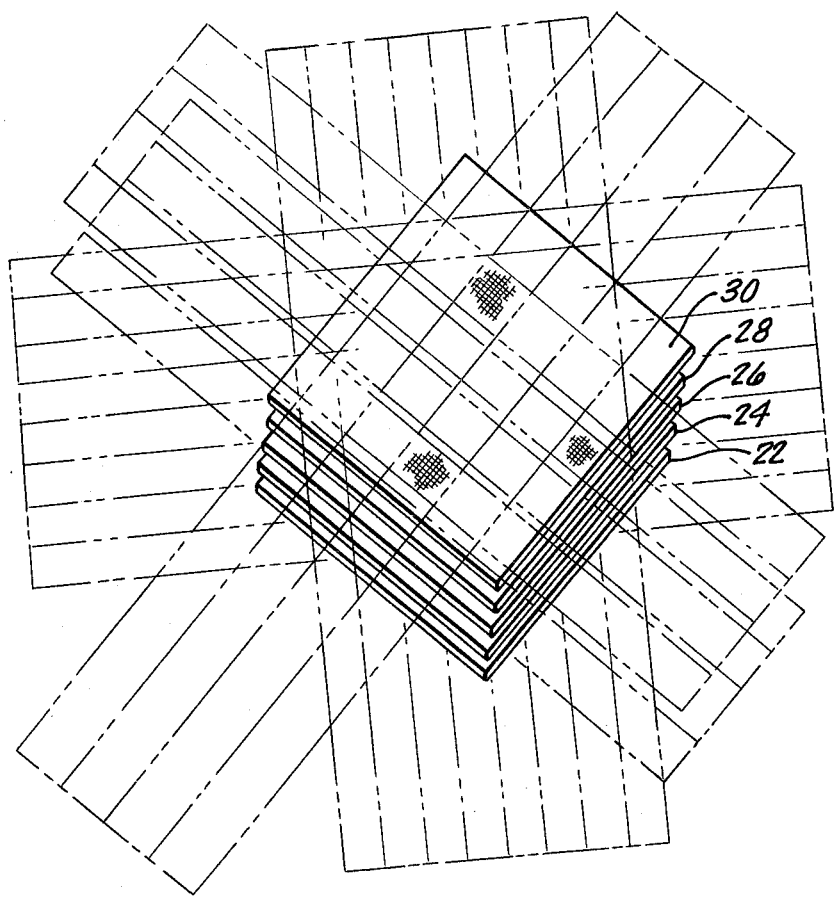
FIG. 2 is a plan view of a face sheet comprising a plurality of oriented layers.
Figure 3:
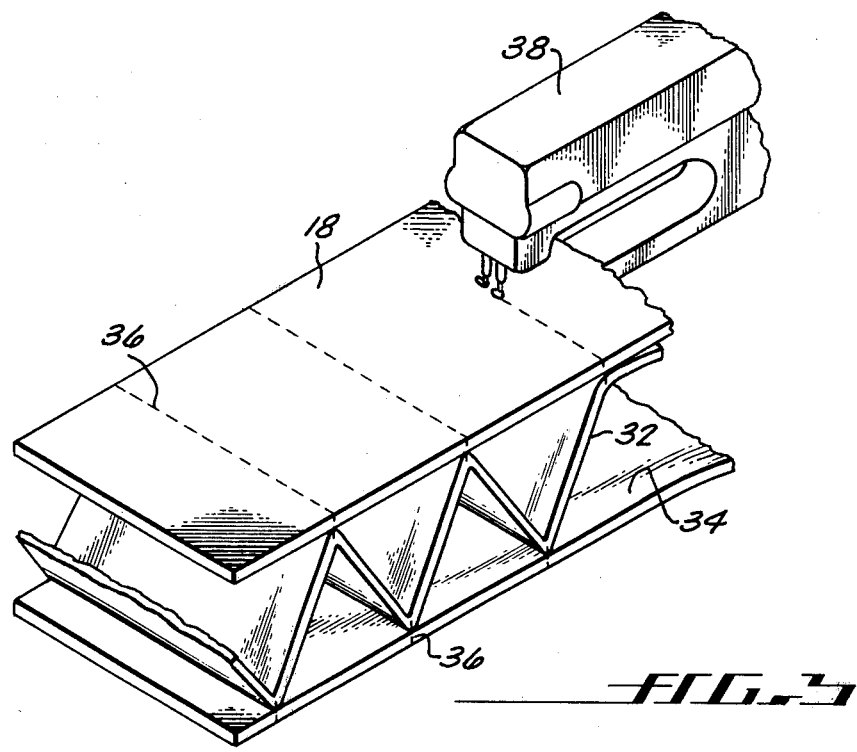
FIG. 3 is a schematic illustration of one method of stitching the face sheets.
Figure 4:
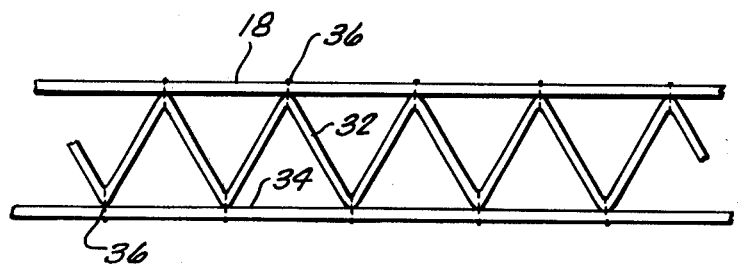
FIG. 4 is an elevational side view of the panel.

Reference is now made to FIG. 2 wherein there is shown a plurality of layers 22, 24, 26, 28 and 30 forming the cover sheet 18 in FIGS. 3 and 4. These layers are angularly oriented to provide additional strength in selected directions as desired or needed. The various layers may be interconnected by stitching or weaving to form a unitary face sheet or they may be interconnected when stitched to the inner core 32 as shown in FIG. 3.

In FIG. 3 there is shown a panel being formed from cover sheet 18, backing sheet 34, and inner core 32. Cover sheet 18 and inner core 32 may be made in any of the various forms previously described whereas backing sheet 34 preferably is impervious to sound waves. The inner core 32 is alternately affixed to cover sheet 18 and backing sheet 34 such as by stitching 36. This stitching 36 may be applied by an appropriate machine 38 by stitching cover sheet 18 and inner core 32 together and then stitching inner core 32 and backing sheet 34 together.

An elevational view of the completed panel is shown in FIG. 4. It preferably may be rigidized by impregnation with a suitable liquid resin and cured while held in the desired shape, it being understood that the panel may be of shapes or configurations other than flat. Appropriate steps in such fabrication are further disclosed in the earlier referred to U.S. Pat. No. 3,481,427.

While certain exemplary embodiments of this invention have been described above and shown in the accompanying drawings, it is to be understood that such embodiments are merely illustrative of, and not restrictive on, the broad invention and that I do not desire to be limited in my invention to the specific construction or arrangements shown and described, for various obvious modifications may occur to persons having ordinary skill in the art.

What is claimed is:

1. The method of making a lock core panel of layers of strands forming a face sheet, a base sheet spaced from said face sheet and impervious to sound waves, and a core sheet, said sheets being fibrous, said fibrous sheets preimpregnated with a resin, comprising the steps of alternately stitching the core sheet to the face and to the base sheet, forming the resulting composite to its resultant shape and curing to create a rigid structural panel.

2. The method of making a lock core panel as in claim 1 wherein said face sheet is formed by angularly orienting said layers of strands and fastening them together for improved strength characteristics.

3. The method of making a lock core panel as in claim 1 wherein preselected fibers are removed from the face sheet before curing to provide openings in said face sheet through which acoustic energy may pass.

4. The method of making a lock core panel as in claim 3 wherein said preselected fibers are of solvent removable rayon acetate which are removed with a solvent before curing of the face sheet.

5. The method of making a lock core panel as in claim 3 wherein said preselected fibers are of water soluble poly vinyl alcohol which are removed with water prior to curing of the face sheet.

* * * * *